Dec. 14, 1948.   E. C. SEAMAN   2,456,155
DEVICE FOR TEACHING THE BLIND
Filed Nov. 15, 1944
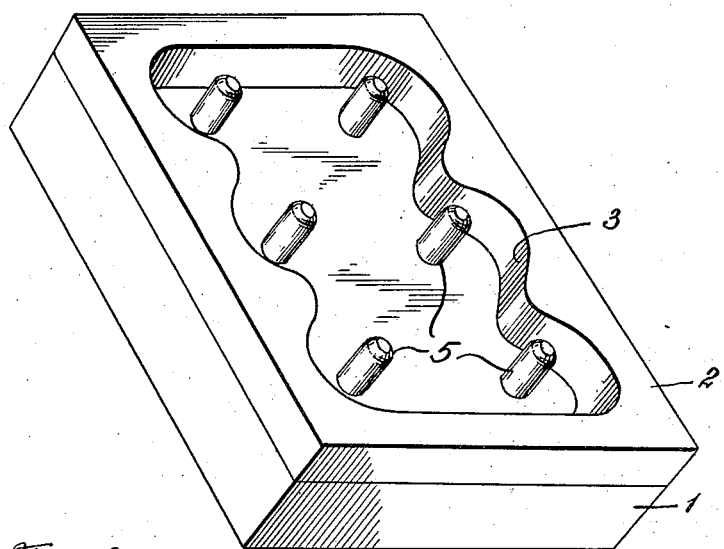
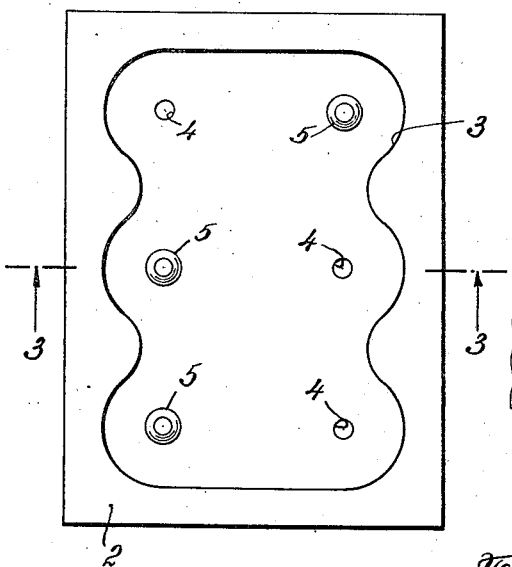
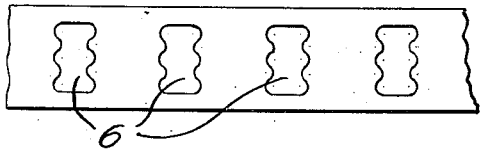
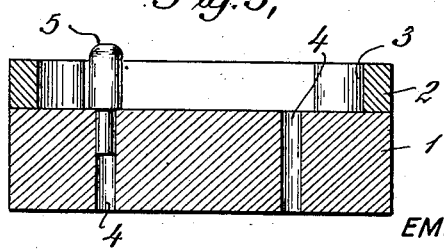
INVENTOR
EMILY C. SEAMAN
BY
Pennie, Davis, Marvin & Edmonds
her   ATTORNEYS Patented Dec. 14, 1948

2,456,155

UNITED STATES PATENT OFFICE 2,456,155

DEVICE FOR TEACHING THE BLIND

Emily C. Seaman, New York, N. Y.

Application November 15, 1944, Serial No. 563,469

2 Claims. (Cl. 35—38)

This invention relates to a device for facilitating the instruction of the blind in the Braille alphabet. The Braille alphabet consists of embossed dots, each letter or other character consisting of a different arrangement of dots with respect to each other and with respect to an imaginary base line. There are six positions of the dots arranged in two parallel rows of three, and the reader, by moving his finger or fingers horizontally across the row, can determine by the sense of touch the arrangement of the dots with respect to each other and the base line and thus determine which character is represented.

In writing in Braille the writer has a frame which overlies the paper, the frame being provided with a series of openings of generally rectangular configuration but with the two vertical sides having three indentations. The writer uses a stylus and by means of the indentations in the sides of the openings which extend in a row across the paper, can produce on the reverse side of the paper embossed dots positioned to constitute the characters of the Braille alphabet. The writing is done from right to left and each character is reversed so that the letter may be "read" in the usual manner by running the fingers across the lines from left to right.

Children who are born blind and whose sense of feel from infancy has been acutely developed, can learn the Braille method of reading and writing by practice and study just as a child who has normal sight learns to read and write. More study and application are necessary for a child to obtain proficiency in reading and writing Braille than in ordinary reading and writing, but the difference is not such that blind children of ordinary intelligence cannot become quite proficient.

When, however, a grown person is blinded, particularly in middle age or later, the difficulty of learning to read and write in Braille is greatly increased. The sense of touch is not acutely developed, the fingers are not nearly so sensitive, and the confusion between the totally different Braille dot arrangement and the visual appearance of letters with which the blinded person was formerly accustomed makes it very difficult for older persons to acquire proficiency in the Braille system.

The invention of this application is to provide a device for aiding adults in memorizing the dot arrangements which make up the Braille course before they begin their actual lessons in Braille reading and writing. I have found one of the great handicaps experienced by adults in acquiring proficiency in Braille is that with their insensitive fingers it is difficult to distinguish between the different Braille characters when printed or written on the small scale which is customary—and necessary if a message of reasonable length can be carried by a single page. Consequently the adult learner must necessarily concentrate primarily on deciding just what arrangement of dots is beneath his finger, and when that decision is made, to translate that arrangement into what letter he remembers it to be. In other words, the adult learner, after deciding with some doubt as to what pattern of dots is beneath his finger, translates that in his mind into a visual image of the dots and then attempts to recall, also as a mental, visual image, the letter or other symbol to which it corresponds.

I have found that the speed of learning Braille is greatly accelerated if, before attempting to read or write, the adult student learns the meaning of each character so well that he subconsciously and immediately reads the latter as "A" or "B," or whatever it may be, without the mental processes necessary when the memory alone must be relied upon.

The article constituting the present invention is to facilitate the rapid learning of the Braille alphabet without dependence on the sensitivity of the sense of touch.

In the accompanying drawings,

Figure 1 shows in perspective the article in substantially full size;

Fig. 2 is a plan view of the article set to represent the Braille character for the letter "S";

Fig. 3 is a sectional view on line 3—3 of Fig. 2;

Fig. 4 shows the dot arrangements of several Braille letters, the scale being double that usually employed for book printing; and Fig. 5 shows on the same scale as Fig. 4 a frame such as employed for writing in Braille.

The device consists primarily of a base 1 in the form of a block, the upper surface 2 of the block being recessed. The recess is of the configuration of the frame used in Braille writing, that is to say, in each of the two longer side walls of the recess there are three semicircular indentations 3 the centers of which correspond to the positions of the embossed dots used in making up the Braille characters.

In the bottom of the recess at the positions corresponding to the centers of the several indentations are holes 4 in each of which is mounted a peg 5 whose top surface is slightly rounded and projects slightly above the walls of the surrounding recess. The recess is slightly smaller than the size of the palm of the normal adult hand so that the device can be held in one hand and the palm of the other hand pressed against the pegs mounted in the holes 4. In the drawing Fig. 2 the pegs are set in an arrangement corresponding with the embossed dots of the Braille letter "S". That is to say, there are two pegs in the lower and middle recess, respectively, at the left side of the block, and one peg in the recess at the top on the right side of the block. When the hand of the learner is pressed against the pegs so arranged he knows instantly that the letter "S" is made up of the described arrangement. After familiarizing himself with this arrangement the pegs are rearranged to form another letter, and so on, through all the Braille characters until the learner can tell instantly when his palm contacts the tops of the pegs just what letter or other symbol is designated by the arrangement which he feels. With this preliminary training the learner makes much more rapid progress in reading and writing Braille. His whole attention can be directed to sensing the arrangement of the dots under his finger, each arrangement instantly representing a character, so that he is markedly aided by the context when he is in doubt as to which of several similar arrangements are present.

In Fig. 5 is shown a short length of the stencil strip customarily used in writing Braille. In using the device a stylus is placed in the desired position in the opening 6 as determined by the indentations in the wall of the opening, and indentations made in the paper to produce on the reverse side the desired character.

The device may be made out of wood or of plastic at very low cost, and its use will be found to shorten by several months the period required for attaining proficiency in the use of Braille by persons blinded after they are grown.

I claim:

1. In a device of the character described, a base member, holes in said base member arranged in a pattern corresponding to the embossings forming the Braille alphabet, and movable pegs fitting the said holes whereby by different arrangements and numbers of said pegs the Braille alphabet may be reproduced, the pegs and the spacing of the perforations being much larger than the embossings and spacings, respectively, of a Braille character when printed in the customary manner.

2. In a device of the character described, a base member, holes in said base member arranged in a pattern corresponding to the embossings forming the Braille alphabet, movable pegs fitting the said holes whereby by different arrangements and numbers of said pegs the Braille alphabet may be reproduced, the pegs and the spacing of the perforations being much larger than the embossings and spacings, respectively, of a Braille character when printed in the customary manner, and a raised border surrounding said holes corresponding in shape to the perforation in the frame used for writing in Braille.

EMILY C. SEAMAN.

REFERENCES CITED

The following references are of record in the file of this patent:

UNITED STATES PATENTS

| Number | Name | Date |
|--------|------|------|
| 1,605,697 | Birdsall | Nov. 2, 1926 |
| 1,800,130 | Brown | Apr. 7, 1931 |

FOREIGN PATENTS

| Number | Country | Date |
|--------|---------|------|
| 14,159 | Great Britain | 1913 |
| 221,926 | Great Britain | 1924 |

OTHER REFERENCES

Psychological and Physiological Apparatus and Supplies. Catalog of C. H. Stoelting Company, 1930. (In Division 53.) Page 129—Item 27,156.